June 2, 1931.    F. G. LILJENROTH    1,807,790
METHOD OF PRODUCING HYDROGEN AND PHOSPHORIC ACID
Filed May 20, 1924
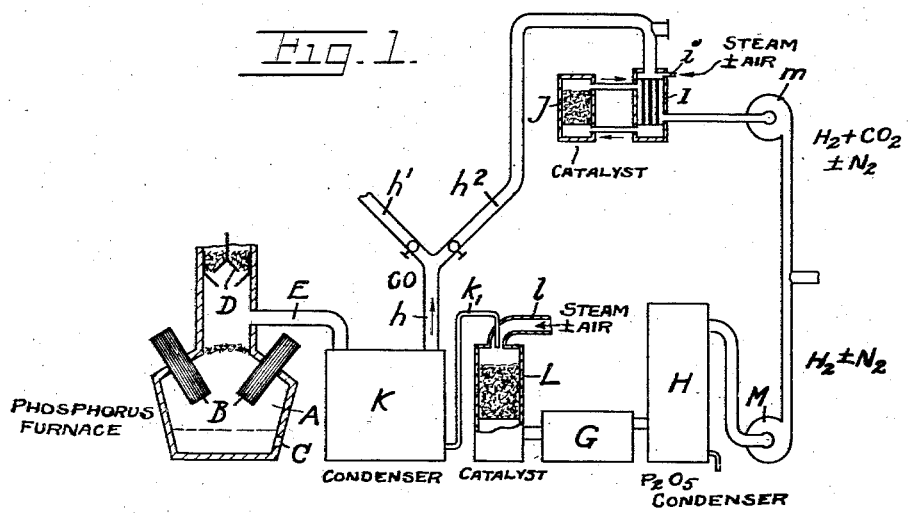
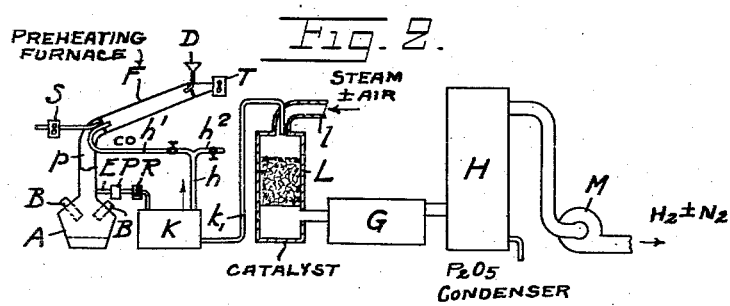

Patented June 2, 1931

1,807,790

UNITED STATES PATENT OFFICE

FRANS GEORG LILJENROTH, OF STOCKSUND, SWEDEN, ASSIGNOR, BY MESNE ASSIGNMENTS, TO DU PONT AMMONIA CORPORATION, OF WILMINGTON, DELAWARE, A CORPORATION OF DELAWARE

METHOD OF PRODUCING HYDROGEN AND PHOSPHORIC ACID

Application filed May 20, 1924, Serial No. 714,546, and in Sweden August 28, 1922.

The present invention relates to an improved method of producing hydrogen and phosphoric acid, involving the preparation of free phosphorus and the reaction thereupon by steam under such conditions as to produce phosphoric anhydrid and free hydrogen, and the object of the invention is to effect certain economies in the process. The present application is in part a continuation of my application 622,401 filed March 2, 1923, wherein the method of producing hydrogen and phosphoric acid, as herein described, is broadly covered. The accompanying drawings are diagrammatic elevations (partly in section) of apparatus suitable for carrying out the present invention. Fig. 1 shows one form of apparatus and Fig. 2 shows a modified form of apparatus, it being understood that the apparatus is shown by way of example only, and not as limiting the invention thereto.

In said drawings A represents an electric furnace, provided with electrodes B, and having a tap hole C for drawing off the slag. The mixture of a suitable phosphate (such as phosphate rock, tricalcium phosphate) a reducing agent such as carbon in the form of coal or coke, and a fluxing agent such as silica or silicious material, is fed into the furnace A, and is heated therein by means of an electric arc, up to a high temperature, sufficient to form a freely fluid slag, whereby phosphorus in the elemental state is formed and vaporized, together with carbon monoxid. The gases and vapors evolved are conducted to a condenser K, which is maintained at about the boiling point of water or at least above the melting point of phosphorus, whereby the elemental phosporus condenses into a liquid state, and the carbon monoxid is drawn off through pipe $h$. In the form of apparatus shown in Fig. 1 a part of the carbon monoxid can be burned for raising steam, or for superheating steam, or for preheating the charge, or for furnishing heat or power for any purposes, while another portion of the carbon monoxid can be led through pipe $h$ and conducted through a preheater I, mixed with steam, and then conducted into the catalyzing chamber J, containing a catalyst such, for example, as iron oxid maintained at a temperature of around 350 to 450° C., whereby the carbon monoxid and steam react to produce free hydrogen and carbon dioxid, which gas mixture is drawn off through the fan. The steam can be introduced through pipe $i$, or if it is desired to produce a mixture of hydrogen and nitrogen, some air can be introduced with said steam. In the apparatus shown in Fig. 2 the gases and vapors leave the furnace A through a pipe or flue E, and a means for recovering some portion or all of the heat of the gases, represented diagrammatically at P, can be connected into this flue. The said flue is further provided with a ventilator R, and leads into a condenser for phosphorus, shown at K. The element P as shown in this figure, may be a steam boiler or a steam superheater or some other means for recovering the heat of the gases. The apparatus shown in Fig. 2 further comprises a pipe $h$ through which the carbon monoxid leaves the condenser K, a branch $h2$ of which may lead to a hydrogen-producing apparatus as shown at IJ in Fig. 1 and $h'$, another branch of this may lead to the lower end of a rotary kiln F, or other device for preheating the charge of materials to be introduced into the electric furnace. The gas may be burned in F by means of air supplied in regulated quantities by fan S. The charge may be introduced into the preheater F by means of the hopper D and at the upper end of the preheater, a fan or ventilator T is placed. The heat produced by the burning of the carbon monoxid gas in the preheater F preheats the charge of material therein, to a high temperature, but not sufficient to evolve elemental phosphorus, after which the material drops through the large pipe or flue $p$, into the electric furnace A. The speeds and dimensions of the ventilators R, S and T are so chosen that there is a slow streaming of gas in a downward direction through the pipe $p$ and out through the pipe E.

The phosphorus collecting in the condenser K may pass through the pipe $k_1$, into the conversion chamber L, which is supplied with high temperature steam (hydrogen monoxide) through the pipe 1.

If desired also a small amount of air can be introduced with the steam, in order to burn a part of the phosphorus to phosphoric anhydrid, in order that the final exit gases may contain not only hydrogen but nitrogen, and if desired the amount of air so introduced can be such as to leave a mixture of hydrogen and nitrogen in the proportions of about 3 to 1 by volume, for the production therefrom of ammonia, by a synthetic process.

Thus, with a properly regulated proportion of air and steam, the reactions taking place may be represented as follows:

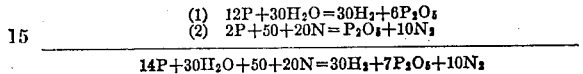

It is understood that if enough air to burn all the phosphorus were to be admitted, the second reaction only would be carried out and no free hydrogen would be formed.

The chamber L can contain a catalytic material or filling material if desired, suitable catalytic materials being those covered in application 663,493 filed September 18, 1923, such as the metals nickel, cobalt, ruthenium, rhodium, palladium, osmium, irridium, platinum, manganese, chromium, molybdenum, tungsten, uranium, copper, silver, gold or the oxids of these metals, or various mixtures of the same, alone or deposited on carriers. The metals, if used as such, may be in the form of fine wire gauze. With the use of catalyzers of the character mentioned the reaction will take place at a much lower temperature and more completely, although if the temperature of the chamber L be held up to about 1000° C., then no catalyzer is necessary.

The gases and vapors then pass into a cooler G and an absorber or condenser H, and the latter may, for example, be a wet condenser, or an electrostatic precipitator.

The remaining gases are then drawn on through the pump M and may conveniently be converted into ammonia, which ammonia can be subsequently caused to combine with the phosphoric acid to produce ammonium phosphate.

What I claim is:

A process of treating phosphates which comprises heating a mixture including phosphate material, a solid reducing agent and a siliceous material, to a temperature incapable of liberating any substantial amount of its phosphorus, by combustion of gas in direct contact therewith, further heating the charge to a temperature sufficient to drive off substantially all its phosphorus in the elemental condition, and separating the phosphorus from the fixed gas present, and utilizing a part of said fixed gas, at least, in said first mentioned step.

In testimony whereof I have signed my name.

FRANS GEORG LILJENROTH.